(12) United States Patent
Ideshio et al.

(10) Patent No.: US 9,481,234 B2
(45) Date of Patent: Nov. 1, 2016

(54) VEHICLE DRIVING SYSTEM, AND METHOD OF ASSEMBLING VEHICLE DRIVING SYSTEM

(71) Applicants: Toyota Jidosha Kabushiki Kaisha, Toyota-shi Aichi-ken (JP); Aisin AW Co., Ltd., Anjo-Shi Aichi-Ken (JP)

(72) Inventors: Yukihiko Ideshio, Nissin (JP); Shinji Matsumoto, Chiryu (JP); Daiki Suyama, Okazaki (JP); Katsuhiko Hattori, Nagoya (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 14/645,996

(22) Filed: Mar. 12, 2015

(65) Prior Publication Data
US 2015/0258884 A1 Sep. 17, 2015

(30) Foreign Application Priority Data

Mar. 14, 2014 (JP) ................................ 2014-052672

(51) Int. Cl.
*B60K 6/405* (2007.10)
*B60K 6/48* (2007.10)

(52) U.S. Cl.
CPC ............... *B60K 6/405* (2013.01); *B60K 6/48* (2013.01); *B60K 2006/4825* (2013.01); *Y02T 10/6221* (2013.01); *Y02T 10/6252* (2013.01); *Y10S 903/902* (2013.01); *Y10T 29/49009* (2015.01)

(58) Field of Classification Search
CPC ............................... B60K 17/02; B60K 17/10

USPC ................................. 903/952; 180/346, 65.6
See application file for complete search history.

(56) References Cited

U.S. PATENT DOCUMENTS

| | | | | |
|---|---|---|---|---|
| 4,095,487 A * | 6/1978 | Cartwright | ............... | B60K 5/04 475/136 |
| 4,325,270 A * | 4/1982 | McRae | ................... | F16H 45/02 475/44 |
| 4,502,352 A * | 3/1985 | Svab | ..................... | F16H 37/022 192/48.611 |
| 4,586,401 A * | 5/1986 | Nogle | ....................... | F16H 3/66 324/173 |
| 5,513,719 A * | 5/1996 | Moroto | .................... | B60K 6/24 180/65.21 |
| 5,788,037 A * | 8/1998 | Forsyth | ................. | F16D 13/683 192/113.23 |
| 6,258,001 B1 * | 7/2001 | Wakuta | .................... | B60K 6/26 192/3.28 |
| 6,478,101 B1 * | 11/2002 | Taniguchi | ................ | B60K 6/26 180/65.1 |
| 6,492,742 B1 * | 12/2002 | Fujikawa | ................ | B60K 6/26 180/65.1 |
| 6,777,837 B2 * | 8/2004 | Tsuzuki | ................... | B60K 6/40 180/65.26 |

(Continued)

FOREIGN PATENT DOCUMENTS

| JP | 2006-089003 A | 4/2006 |
|---|---|---|
| JP | 2006-142848 A | 6/2006 |

(Continued)

*Primary Examiner* — Jeffrey J Restifo
(74) *Attorney, Agent, or Firm* — Dinsmore & Shohl LLP

(57) ABSTRACT

A vehicle driving system includes an engine, an electric motor, a clutch, a torque converter, a transmission, a front module, and a housing. The clutch is configured to selectively connect or interrupt a power transmission path between the engine and the electric motor. The front module includes the clutch and the electric motor. The housing has an accommodation space that accommodates the front module and an accommodation space that accommodates the torque converter. The housing is a single member. The engine, the electric motor, the clutch, the torque converter and the transmission are arranged in series with one another.

9 Claims, 5 Drawing Sheets

(56) References Cited

U.S. PATENT DOCUMENTS

| | | | | |
|---|---|---|---|---|
| 6,863,140 B2* | 3/2005 | Noreikat | ............... | B60K 6/40 180/65.23 |
| 6,935,450 B1* | 8/2005 | Tsuzuki | ............... | B60K 6/26 180/65.26 |
| 7,017,693 B2* | 3/2006 | Omote | ............... | B60K 6/26 180/65.26 |
| 7,114,604 B2* | 10/2006 | Masuya | ............... | B60K 6/387 192/3.29 |
| 7,191,856 B2* | 3/2007 | Morishita | ............... | B60K 6/26 180/65.21 |
| 7,234,577 B2* | 6/2007 | Masuya | ............... | F16H 45/02 192/3.29 |
| 7,370,716 B2* | 5/2008 | Hickam | ............... | B60K 6/24 180/65.31 |
| 7,489,114 B2* | 2/2009 | Nomura | ............... | B60K 6/26 322/33 |
| 7,509,802 B2* | 3/2009 | Hammond | ............... | B60K 6/26 60/330 |
| 7,679,238 B2* | 3/2010 | Nomura | ............... | B60K 6/365 310/100 |
| 8,333,680 B2* | 12/2012 | Kasuya | ............... | B60K 6/387 475/5 |
| 8,448,541 B2* | 5/2013 | Kasuya | ............... | B60K 6/387 180/65.245 |
| 8,545,355 B2* | 10/2013 | Frait | ............... | B60K 6/26 29/596 |
| 8,622,182 B2* | 1/2014 | Iwase | ............... | B60K 6/26 180/65.26 |
| 8,652,001 B2* | 2/2014 | Iwase | ............... | B60K 6/40 477/8 |
| 8,758,180 B2* | 6/2014 | Frait | ............... | F16H 45/00 475/48 |
| 8,836,181 B2* | 9/2014 | Iwase | ............... | B60K 6/40 180/65.22 |
| 8,836,187 B2* | 9/2014 | Iwase | ............... | B60K 6/26 180/65.265 |
| 8,838,366 B2* | 9/2014 | Suyama | ............... | B60K 6/387 477/168 |
| 8,863,926 B2* | 10/2014 | Knowles | ............... | B60K 6/387 192/48.611 |
| 8,978,799 B2* | 3/2015 | Arnold | ............... | B60K 6/26 180/65.22 |
| 8,997,956 B2* | 4/2015 | Iwase | ............... | B60K 6/26 192/3.26 |
| 9,068,638 B2* | 6/2015 | Iwase | ............... | B60K 6/26 |
| 9,086,126 B2* | 7/2015 | Frait | ............... | F16H 45/00 |
| 9,140,311 B2* | 9/2015 | Iwase | ............... | F16D 25/0638 180/65.25 |
| 9,263,924 B2* | 2/2016 | Frait | ............... | H02K 7/006 |
| 2002/0036434 A1* | 3/2002 | Tsuzuki | ............... | B60K 6/40 310/83 |
| 2003/0057004 A1* | 3/2003 | Morishita | ............... | B60K 6/26 180/65.26 |
| 2004/0045752 A1* | 3/2004 | Omote | ............... | B60K 6/26 180/65.26 |
| 2004/0130225 A1* | 7/2004 | Mencher | ............... | B60K 6/40 310/78 |
| 2005/0037883 A1* | 2/2005 | Motoike | ............... | B60K 6/365 475/5 |
| 2013/0111891 A1* | 5/2013 | Iwase | ............... | F16D 33/02 60/347 |
| 2015/0239332 A1* | 8/2015 | Okuda | ............... | B60K 6/40 60/716 |
| 2015/0258884 A1* | 9/2015 | Ideshio | ............... | B60K 6/405 180/65.25 |
| 2015/0328974 A1* | 11/2015 | Okuda | ............... | B60K 6/383 192/41 R |

FOREIGN PATENT DOCUMENTS

| JP | 2010-120543 A | 6/2010 |
|---|---|---|
| JP | 2013-095390 A | 5/2013 |

* cited by examiner

VEHICLE DRIVING SYSTEM, AND METHOD OF ASSEMBLING VEHICLE DRIVING SYSTEM

INCORPORATION BY REFERENCE

The disclosure of Japanese Patent Application No. 2014-052672 filed on Mar. 14, 2014 including the specification, drawings and abstract is incorporated herein by reference in its entirety.

BACKGROUND OF THE INVENTION

1. Field of the Invention

The invention relates to a vehicle driving system.

2. Description of Related Art

Japanese Patent Application Publication No. 2013-095390 (JP 2013-095390 A) describes a vehicle driving system. The vehicle driving system includes an engine, an electric motor, a clutch, a torque converter and a transmission in series with one another. The clutch selectively connects or interrupts a power transmission path between the engine and the electric motor. In a vehicle driving system 1 described in JP 2013-095390 A, a rotary electric machine MG (electric motor) and a first clutch Cl are accommodated in a first case portion 3a and constitute one module, and a torque converter TC and a transmission mechanism TM are accommodated in a second case portion 3b and constitute another module. Mating faces of the first case portion 3a and second case portion 3b have flanges that radially extend with respect to a rotation axis, and the flanges are fastened by bolts.

SUMMARY OF THE INVENTION

The vehicle driving system 1 described in JP 2013-095390 A has the bolt-fastening flanges in the mating faces of the first case portion 3a and second case portion 3b, so a case has such a shape that the case protrudes in the radial direction with respect to the rotation axis. Thus, there is an inconvenience that the radial size of the vehicle driving system increases by the size of the flanges.

The invention provides a structure that is able to reduce the radial size of a vehicle driving system, including an engine, an electric motor, a clutch, a torque converter and a transmission in series with one another, and a method of assembling the vehicle driving system.

A first aspect of the invention provides a vehicle driving system. The vehicle driving system includes an engine, an electric motor, a clutch, a torque converter, a transmission, and a housing. The clutch is configured to selectively connect or interrupt a power transmission path between the engine and the electric motor. The housing has an accommodation space that accommodates a front module and an accommodation space that accommodates the torque converter. The housing is a single member. The front module includes the clutch and the electric motor. The engine, the electric motor, the clutch, the torque converter and the transmission are arranged in series with one another.

In the vehicle driving system may further includes a partition wall. The partition wall may be provided between the accommodation space that accommodates the front module and the accommodation space that accommodates the torque converter in the housing, the partition wall may separate the accommodation spaces from each other, and the partition wall may be separately provided from the housing.

In the vehicle driving system, the electric motor may include a rotor and a stator that are fastened to the partition wall.

In the vehicle driving system, the partition wall may be fastened to an inside of the housing by a bolt, and the bolt may be fastened from a side on which the front module is provided.

In the vehicle driving system, the partition wall may be fastened to the housing by a first bolt, the stator may be fastened to the partition wall by a second bolt, and the first bolt and the second bolt may be fastened from the same side.

In the vehicle driving system, the partition wall may be fastened to the housing by a first bolt, the stator may be fastened to the partition wall by a second bolt, and the first bolt and the second bolt may be provided at overlapped positions in a circumferential direction.

In the vehicle driving system, the housing and the partition wall may be fastened by mating, and may be fastened by a bolt.

In the vehicle driving system, a rotor of the electric motor may be supported by the partition wall.

In the vehicle driving system, the partition wall may have an oil passage that supplies oil to at least one of the clutch or the electric motor. With the above configuration, the partition wall has the oil passage, so it is not required to provide an additional oil passage that supplies oil to the clutch or the electric motor.

A second aspect of the invention provides a method of assembling a vehicle driving system. The vehicle driving system includes an engine, an electric motor, a clutch, a torque converter, and a housing. The clutch is configured to selectively connect or interrupt a power transmission path between the engine and the electric motor. The method includes: assembling the torque converter from one side of the housing in an axial direction of the housing; in a state where the torque converter has been assembled, inserting a partition wall into the housing from the same side as assembling of the torque converter, and fastening the partition wall to the housing; and inserting a front module, including the clutch and the electric motor, from the same side as assembling of the torque converter, and then assembling the front module to the partition wall. In this way, the partition wall is assembled after the torque converter has been assembled to the housing, and then the front module is further assembled from the same side, so assembling of the vehicle driving system is easy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is viewed in an axial direction;

DETAILED DESCRIPTION OF EMBODIMENTS

Hereinafter, an embodiment of the invention will be described in detail with reference to the accompanying drawings. In the following embodiment, the drawings are modified or simplified where appropriate, and the scale ratio, shape, and the like, of each portion are not always drawn accurately.

Figure 1:
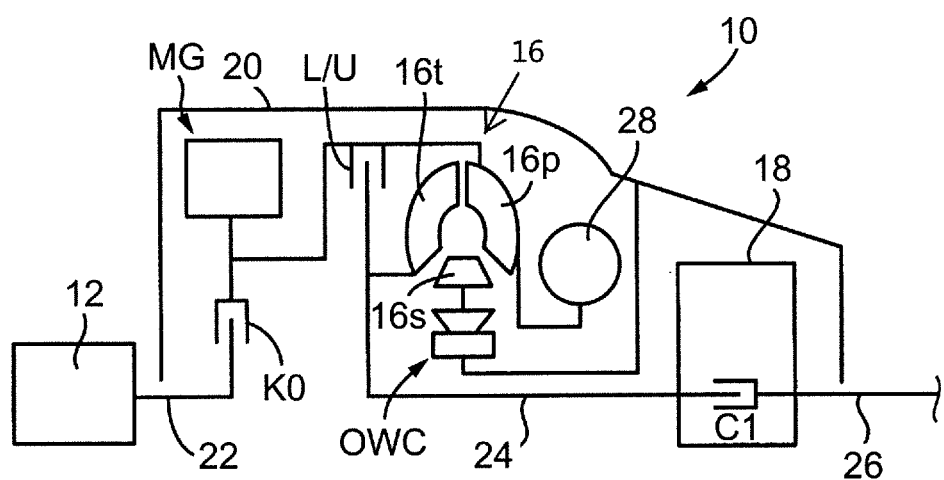
FIG. 1 is a skeletal view for illustrating the schematic configuration of a vehicle driving system according to an embodiment of the invention.

FIG. 1 is a skeletal view for illustrating the schematic configuration of a vehicle driving system 10 according to the present embodiment. The vehicle driving system 10 is a hybrid driving system in which an engine 12, an electric motor MG, a clutch K0, a torque converter 16 and an automatic transmission 18 (transmission) are arranged in series with one another with respect to a common rotation axis. The clutch K0 selectively connects or interrupts a power transmission path between the engine 12 and the electric motor MG. The electric motor MG the clutch K0, the torque converter 16 and the automatic transmission 18 are accommodated in a housing 20 that functions as a non-rotating member.

An engine output shaft 22 of the engine 12 is connected to the electric motor MG via the clutch K0 such that power is transmittable. The electric motor MG is connected to a pump impeller 16p of the torque converter 16. The torque converter 16 is a fluid transmission device, and includes the pump impeller 16p, a turbine runner 16t and a stator impeller 16s. The pump impeller 16p is connected to the electric motor MG. The turbine runner 16t corresponds to an output-side member of the torque converter 16. The stator impeller 16s is connected to the housing 20 via a one-way clutch OWC. The housing 20 is the non-rotating member.

A lockup clutch L/U is provided between the electric motor MG and the turbine runner 16t of the torque converter 16. The lockup clutch L/U is used to selectively connect the electric motor MG to the turbine runner 16t or disconnect the electric motor MG from the turbine runner 16t. When the lockup clutch L/U is completely engaged, the pump impeller 16p and turbine runner 16t of the torque converter 16 are integrally rotated. An oil pump 28 is connected to the pump impeller 16p.

The turbine runner 16t of the torque converter 16 is connected to the automatic transmission 18 via a turbine shaft 24. The automatic transmission 18 is, for example, a planetary gear-type multi-speed transmission that functions as a stepped automatic transmission. In the stepped automatic transmission, a plurality of speed positions (gear positions) are selectively established as a result of a shift by changing the engaged/released states of any two of a plurality of engagement devices, that is, for example, hydraulic friction engagement devices, such as a clutch C and a brake B, (that is, by engaging and releasing any two of the hydraulic friction engagement devices). That is, the automatic transmission 18 is a stepped transmission that carries out a so-called clutch-to-clutch shift. The automatic transmission 18 changes the speed of rotation of the turbine shaft 24, and then outputs the rotation from the transmission output shaft 26. In the automatic transmission 18, a predetermined gear position (speed position) is established in accordance with driver's accelerator operation, a vehicle speed V, and the like, through engagement/release control over the clutch C and the brake B. When the vehicle starts moving, a starting clutch Cl for starting the vehicle is engaged.

Figure 2:
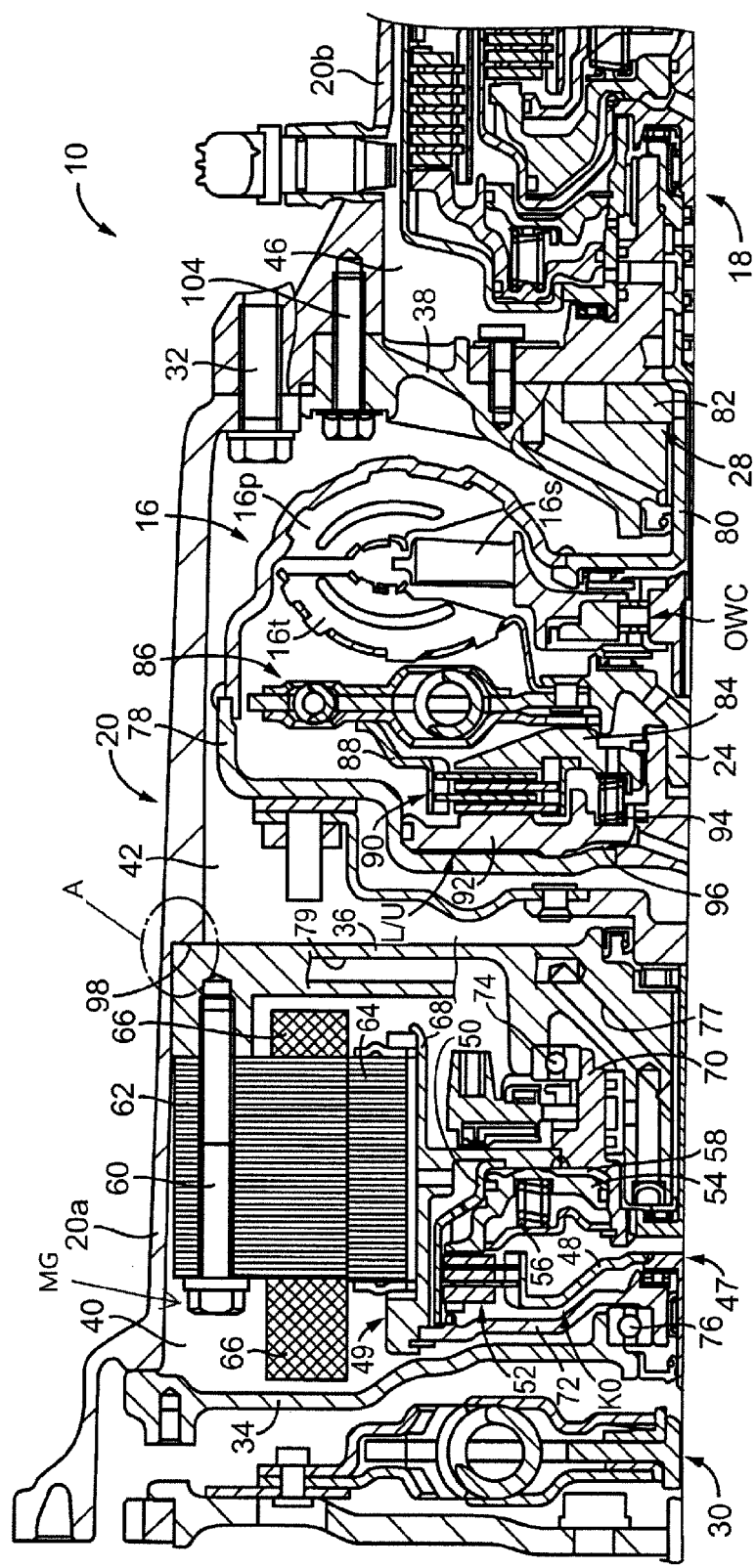
FIG. 2 is a cross-sectional view of the vehicle driving system shown in FIG. 1.

FIG. 2 is a cross-sectional view of the vehicle driving system 10 shown in FIG. 1. In FIG. 2, the engine 12 is omitted, and the automatic transmission 18 is partially shown. The vehicle driving system 10 includes a damper mechanism 30, the clutch K0, the electric motor MG, the torque converter 16, the oil pump 28 and the automatic transmission 18. The torque converter 16 includes the lockup clutch L/U. The damper mechanism 30, the clutch K0, the electric motor MG, the torque converter 16, the oil pump 28 and the automatic transmission 18 are arranged inside the housing 20 sequentially from the engine side (the left side in FIG. 2) toward the automatic transmission side (the right side in FIG. 2). The damper mechanism 30 is connected to the engine 12 such that power is transmittable.

The housing 20 is formed of a cylindrical first housing 20a and a cylindrical second housing 20b, and is provided as one unit by fastening the first housing 20a and the second housing 20b to each other by bolts 32. The inside of the housing 20 is partitioned by three partition walls, that is, a disc-shaped first partition wall 34, a disc-shaped second partition wall 36 and a disc-shaped third partition wall 38. Thus, three spaces, that is, a first space 40, a second space 42 and a third space 46, are defined inside the housing 20. Each of the first partition wall 34, the second partition wall 36 and the third partition wall 38 is separately provided from the housing 20, and is fastened to the housing 20 by bolts.

The first space 40 is defined by partitioning the inside of the first housing 20a with the use of the disc-shaped first partition wall 34 and the disc-shaped second partition wall 36. The clutch K0 and the electric motor MG are accommodated in the first space 40. The clutch K0 and the electric motor MG constitute a single front module 47. The second partition wall 36 is a partition wall that separates the front module 47 and the torque converter 16 from each other.

The clutch K0 is a hydraulic friction engagement device. The clutch K0 includes an input rotating member 48, an output rotating member 50, a friction engagement element 52, a piston 54, and a spring 56. The power of the engine 12 is transmitted to the input rotating member 48. The output rotating member 50 is connected to a rotor shaft 49 of the electric motor MG. The friction engagement element 52 is interposed between the input rotating member 48 and the output rotating member 50. The friction engagement element 52 is used to selectively connect the input rotating member 48 to the output rotating member 50 or disconnect the input rotating member 48 from the output rotating member 50. The piston 54 is used to press the friction engagement element 52. The spring 56 constantly urges the piston 54 toward a non-pressing side at which the friction engagement element 52 is not pressed (the automatic transmission side, and the right side in FIG. 2).

In a state where no hydraulic pressure is supplied to a hydraulic chamber 58 defined adjacent to the back face of the piston 54, the piston 54 is urged by the spring 56 toward the non-pressing side of the friction engagement element 52. Thus, the friction engagement element 52 is set to a released state, and the input rotating member 48 and the output rotating member 50 relatively rotate. That is, the clutch K0 is set to a released state. On the other hand, when hydraulic pressure is supplied to the hydraulic chamber 58, the piston 54 is moved toward a pressing side (the engine side, and the left side in FIG. 2) against the urging force of the spring 56, and presses the friction engagement element 52. At this time, the friction engagement element 52 is engaged, and the input rotating member 48 is connected to the output rotating member 50. That is, the clutch K0 is connected.

The electric motor MG is a so-called motor generator having the function of a motor that generates mechanical driving force from electric energy and the function of a generator that generates electric energy from mechanical energy. The electric motor MG includes an annular stator 62 and a rotor 64. The stator 62 serves as a stator that is fastened (fixed) to the second partition wall 36 by bolts 60 so as to be non-rotatable. The rotor 64 serves as a rotor that is arranged at a predetermined gap from the inner periphery of the stator 62. The stator 62 includes coil ends 66 at both sides in the axial direction.

The inner peripheral portion of the rotor 64 is connected to the rotor shaft 49, and the rotor 64 is integrally rotatable with the rotor shaft 49. The rotor shaft 49 includes a cylindrical first member 68 and an annular second member 70. The outer periphery of the first member 68 is connected to the inner peripheral portion of the rotor 64, and has a disc-shaped portion extending radially inward from the inner periphery with respect to the rotation axis. The second member 70 is welded to the inner peripheral end of the disc-shaped portion provided in the first member 68. A disc-shaped support member 72 is integrally coupled to the inner peripheral end of the first member 68 at the engine side (the left side in FIG. 2) in the axial direction.

A ball bearing 74 is arranged at the outer peripheral end of the second member 70 at the automatic transmission side (the right side in FIG. 2) in the axial direction. The second member 70 is rotatably supported by the second partition wall 36 via the ball bearing 74. A ball bearing 76 is arranged between the inner peripheral portion of the support member 72 and the inner peripheral end of the first partition wall 34. The support member 72 is rotatably supported by the first partition wall 34 via the ball bearing 76. Thus, the rotor 64 and rotor shaft 49 of the electric motor MG are rotatably supported by (fastened to) the second partition wall 36 via the ball bearing 74, and is rotatably supported by (fastened to) the first partition wall 34 via the ball bearing 76.

The second partition wall 36 has an oil passage 77 and an oil passage 79. The oil passage 77 is used to supply oil (hydraulic oil) to the hydraulic chamber 58 of the clutch K0. The oil passage 79 is used to supply oil (cooling oil) to the coil ends 66 of the electric motor MG. In this way, because the second partition wall 36 has the oil passages 77, 79, it is not required to additionally provide an oil passage for supplying oil to the clutch K0 or the electric motor MG.

The second space 42 is defined by partitioning the inside of the first housing 20*a* with the use of the disc-shaped second partition wall 36 and the disc-shaped third partition wall 38. The torque converter 16 including the lockup clutch L/U is accommodated in the second space 42.

The torque converter 16 includes a converter cover 78, the pump impeller 16*p*, the turbine runner 16*t* and the stator impeller 16*s*. Power is transmitted from the engine 12 or the electric motor MG to the converter cover 78. The pump impeller 16*p* is connected to the converter cover 78. The turbine runner 16*t* is arranged opposite to the pump impeller 16*p*. The stator impeller 16*s* is connected to the third partition wall 38 of the housing 20 via the one-way clutch OWC.

The end of the pump impeller 16*p* is connected to a power transmission shaft 80. The power transmission shaft 80 has a cylindrical shape. One end of the power transmission shaft 80 in the axial direction protrudes in the radial direction. The outer peripheral end of the power transmission shaft 80 is connected to the pump impeller 16*p*. The other end of the power transmission shaft 80 in the axial direction is connected to a drive gear 82 of the oil pump 28. Thus, when the pump impeller 16*p* rotates, the oil pump 28 is driven. The oil pump 28 is provided so as to be accommodated in the third partition wall 38.

The lockup clutch L/U is provided between the converter cover 78 and the turbine runner 16*t* in the axial direction. The lockup clutch L/U is provided so as to be able to connect the converter cover 78 (that is, the pump impeller 16*p*) to the turbine runner 16*t* or disconnect the converter cover 78 from the turbine runner 16*t*. The lockup clutch L/U includes an input rotating member 84, an output rotating member 88, a friction engagement element 90, a piston 92, and a spring 94. The input rotating member 84 integrally rotates with the converter cover 78. The output rotating member 88 is connected to the turbine shaft 24 via a damper mechanism 86. The friction engagement element 90 is interposed between the input rotating member 84 and the output rotating member 88. The piston 92 is used to press the friction engagement element 90. The spring 94 urges the piston 92 toward a side away from the friction engagement element 90 (the engine side, and the left side in FIG. 2).

In a state where no hydraulic pressure is supplied to a hydraulic chamber 96 defined adjacent to the back face of the piston 92, the piston 92 is urged by the spring 94 away from the friction engagement element 90. Thus, the friction engagement element 90 is set to a released state, and the input rotating member 84 and the output rotating member 88 relatively rotate. That is, the lockup clutch L/U is set to a released state. On the other hand, when hydraulic pressure is supplied to the hydraulic chamber 96, the piston 92 is moved toward the friction engagement element 90 against the urging force of the spring 94, and presses the friction engagement element 90. At this time, a torque according to the hydraulic pressure of the hydraulic chamber 96 is transmitted through the friction engagement element 90, and the lockup clutch L/U is controlled between a slipped engagement state and a completely engagement state.

The third space 46 is defined by partitioning the inside of the second housing 20*b* with the use of the disc-shaped third partition wall 38. The automatic transmission 18 is accommodated in the third space 46. The automatic transmission 18 is a stepped planetary gear-type transmission that includes the plurality of clutch C and brake B, each of which is a hydraulic friction engagement device. In the stepped planetary gear transmission, the plurality of speed positions are established by changing the released/engaged states of these clutch C and brake B. Because the automatic transmission 18 is a known technique, the description of the specific structure of the automatic transmission 18 is omitted.

In the thus configured vehicle driving system 10, the housing (first housing 20*a*) inside which the front module 47 is accommodated and the housing (first housing 20*a*) inside which the torque converter 16 is accommodated are integrally formed. This is allowed by separately providing the second partition wall 36 from the first housing 20*a*. The second partition wall 36 separates the first space 40 and the second space 42 from each other. Thus, flanges that are required in order to fasten housings to each other by bolts are not required, and the radial size of the vehicle driving system 10 is reduced.

Figure 3:
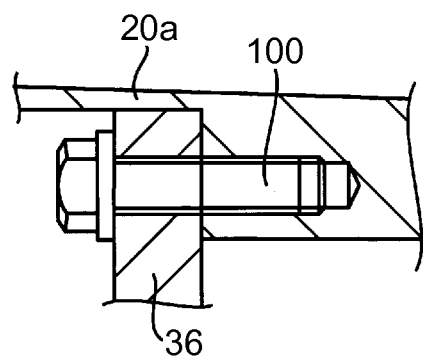
FIG. 3 is a view that shows a different phase in a circumferential direction from a fastening portion of a stator and a second partition wall, indicated by an ellipse X (alternate long and short dashed line) in FIG. 2, specifically a fastening portion of a housing and the second partition wall.

Next, the mechanism of fastening the first housing 20*a* to the second partition wall 36 will be described. FIG. 3 shows a view at a different phase in the circumferential direction from a fastening portion of the stator 62 and the second partition wall 36, indicated by the ellipse A (alternate long and short dashed line) in FIG. 2, specifically, a fastening portion of the first housing 20*a* and the second partition wall 36. As shown in FIG. 3, a portion of the second partition wall 36 in the circumferential direction, which is fastened to the first housing 20*a*, is thinner in the thickness in the axial direction of the second partition wall 36 than a portion of the second partition wall 36 in the circumferential direction, which is fastened to the stator 62. In a state where the second partition wall 36 is in contact with a mating face 98 provided in the first housing 20*a*, a bolt 100 that fastens the second partition wall 36 to the first housing 20*a* is fastened from the front module 47 side, and the second partition wall 36 is integrally fixed to the first housing 20*a*. The fastening portion of the second partition wall 36 by the bolt 100 is provided at multiple locations in the circumferential direction.

Figure 4:
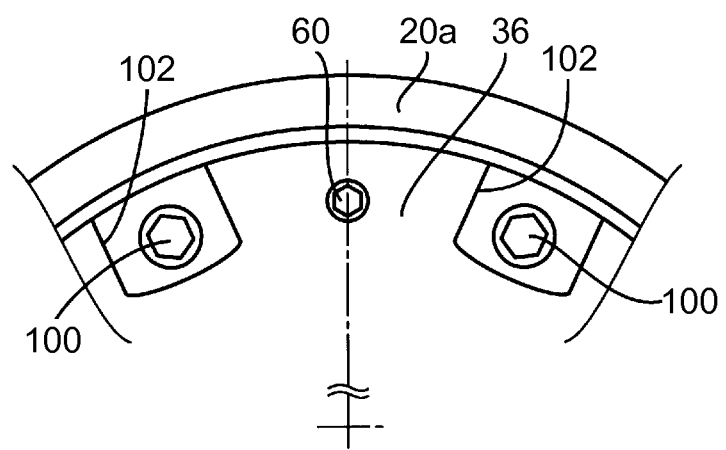
FIG. 4 is a view when

FIG. 4 is a view when FIG. 3 is viewed in the axial direction. As shown in FIG. 4, each of the portions of the second partition wall 36, to which the bolts 100 are fastened, has a recess 102, and is thin in the axial direction. The depth of each recess 102 is larger than the height of the hexagon head of each bolt 100. This prevents interference of the stator 62 of the electric motor MG with the hexagon heads of the bolts 100 at the time of fastening the stator 62 to the second partition wall 36. The bolt 60 and the bolt 100 are fastened from the same side in the axial direction, and are alternately arranged at overlapped positions in the circumferential direction. Each bolt 60 corresponds to a second bolt for fastening a stator of the invention to a partition wall. Each bolt 100 corresponds to a first bolt for fastening the partition wall of the invention to a housing.

Figure 5:
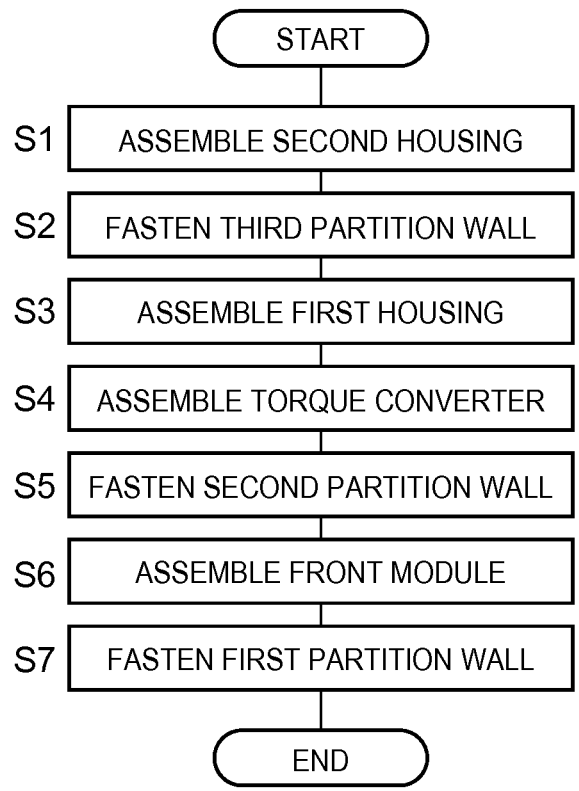
FIG. 5 is a flowchart that illustrates the process of assembling the vehicle driving system shown in FIG. 1.

Next, assembling of the vehicle driving system 10 will be described. FIG. 5 is a flowchart that illustrates the process of assembling the vehicle driving system 10. In assembling, components are sequentially assembled from one side in the axial direction (the automatic transmission 18 side). Initially, in step S1, the automatic transmission 18 is assembled to the second housing 20*b*. In step S2, in a state where the automatic transmission 18 has been assembled to the second housing 20*b*, the third partition wall 38 is fastened to the second housing 20*b* by bolts 104. In step S3, the first housing 20*a* is fastened to the second housing 20*b* by the bolts 32. In step S4, the torque converter 16 is inserted into the first housing 20*a* from the engine side in the axial direction, and is assembled to the inside of the first housing 20*a*.

In step S5, the second partition wall 36 is assembled to the first housing 20*a*. Specifically, in a state where the torque converter 16 has been assembled to the first housing 20*a*, the second partition wall 36 is inserted from the same side as assembling of the torque converter 14, and the second partition wall 36 is fastened (fixed) to the first housing 20*a* by the bolts 100. In step S6, the front module 47 formed of the electric motor MG, the clutch K0, and the like, is inserted into the first housing 20*a* from the same side as assembling of the torque converter 14, and is then assembled to the second partition wall 36. In step S7, the first partition wall 34 is assembled to the first housing 20*a*. In this way, components are sequentially assembled from one side in the axial direction, with the result that assembling of the vehicle driving system 10 is easy.

As described above, according to the present embodiment, a portion of the first housing 20*a*, which accommodates the front module 47, and a portion of the first housing 20*a*, which accommodates the torque converter 16, are integrally formed. Therefore, flanges that protrude from the housing in the radial direction with respect to the rotation axis are not required although the flanges are required when a housing that accommodates the front module 47 and a housing that accommodates the torque converter 16 are separately provided from each other. Thus, the flanges do not need to be provided, so the radial size of the vehicle driving system 10 is reduced.

According to the present embodiment, the rotor 64 and stator 62 of the electric motor MG are fastened to the same second partition wall 36, so the gap between the rotor 64 and the stator 62 is not influenced by an assembling deviation, with the result that it is possible to reduce the gap.

According to the present embodiment, it is possible to assemble the torque converter 16 after the housing 20 has been assembled, so assembling of the vehicle driving system 10 is easy. According to the present embodiment, the rotor 64 and stator 62 of the electric motor MG are fastened by the same members, so the gap between the rotor 64 and the stator 62 is not influenced by an assembling deviation, with the result that it is possible to reduce the gap. According to the present embodiment, it is possible to assemble the housing 20, the torque converter 16 and the partition wall in the stated sequence, so assembling of the vehicle driving system 10 is easy.

According to the present embodiment, in assembling the vehicle driving system 10, the bolts 60, 100 are allowed to be fastened from the same side, so assembling of the vehicle driving system 10 is easy.

According to the present embodiment, because the bolts 60 and the bolts 100 are provided at the overlapped positions in the circumferential direction, the radial size of the vehicle driving system 10 is reduced as compared to the case where the bolts 60 and the bolts 100 are arranged at different positions in the radial direction.

According to the present embodiment, the rotor 64 is rotatably supported by the second partition wall 36, so it is not required to additionally provide a support member for the rotor 64. That is, partition wall 36 also functions as a support member for the rotor 64, so the partition 36 wall is effectively utilized.

According to the present embodiment, the second partition wall 36 has the oil passage 77 for supplying hydraulic oil to the clutch K0, and the second partition wall 36 has the oil passage 79 for supplying cooling oil to the coil ends 66 of the electric motor MG, so it is not required to additionally provide these oil passages.

According to the present embodiment, because components are sequentially assembled from one side of the first housing 20*a* in the axial direction, assembling of the vehicle driving system 10 is easy.

Next, another embodiment of the invention will be described. In the following description, like reference numerals denote portions common to the above-described embodiment, and the description thereof is omitted.

Figure 6:
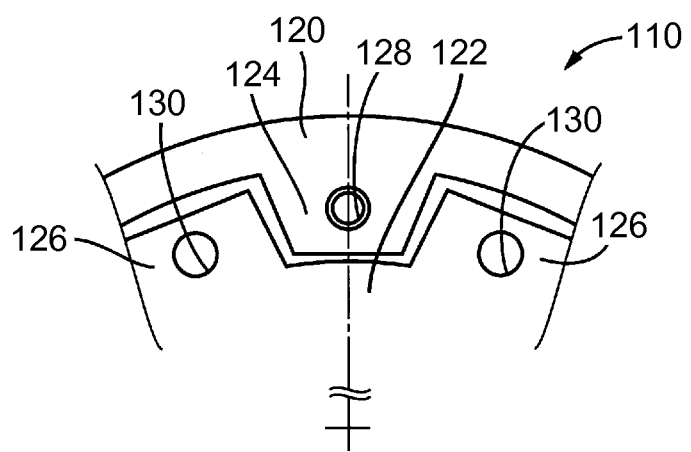
FIG. 6 is a view of a fastening portion of a first housing and a second partition wall in a vehicle driving system according to another embodiment of the invention when viewed in an axial direction.

FIG. 6 is a view of a fastening portion of a first housing 120 and a second partition wall 122 in a vehicle driving system 110 according to another embodiment of the invention when viewed in an axial direction, and corresponds to FIG. 4 in the above-described embodiment. In FIG. 6, fastening bolts are omitted and only bolt holes are shown; however, actually, the first housing 120 is fastened to the second partition wall 122 by bolts (not shown).

As shown in FIG. 6, a plurality of spline fitting teeth 124 (internal teeth) are provided on the inner periphery of the first housing 120 in the circumferential direction. A plurality of spline fitting teeth 126 (external teeth) are provided on the outer periphery of the second partition wall 122 in the circumferential direction. The spline fitting teeth 126 are fitted to the fitting teeth 124 of the first housing 120. The fitting teeth 124 of the first housing 120 and the fitting teeth 126 of the second partition wall 122 are fitted to each other so as to be relatively non-rotatable.

Each of the fitting teeth 124 of the first housing 120 has a bolt hole 128 for fastening (fixing) the stator 62 of the electric motor MG to the first housing 120 by a bolt (not shown). Each of the fitting teeth 126 of the second partition wall 122 has a bolt hole 130 for fastening (fixing) the second partition wall 122 to the first housing 120 by a bolt (not shown). The bolt hole 128 and the bolt hole 130 are alternately provided at the overlapped positions in the circumferential direction. That is, the bolt that fastens the second partition wall 122 to the first housing 120 and the bolt that fastens the stator 62 to the first housing 120 are alternately provided at the overlapped positions in the circumferential direction.

In this way, the first housing 120 and the second partition wall 122 are fitted to each other by the fitting teeth, and each of the fitting teeth has the bolt hole 128 or the bolt hole 130. Thus, the bolts for fastening the second partition wall 122 and the bolts for fastening the stator 62 are allowed to be arranged at the overlapped positions in the circumferential direction (the same position in the radial direction). As a result, because the fastening portions of the second partition wall 122 and the fastening portions of the stator 62 are set at the same position in the radial direction, the radial size of the vehicle driving system 110 is reduced.

As described above, according to the present embodiment as well, a substantially similar advantageous effect to that of the above-described embodiment is obtained. In the present embodiment, because the bolts for fastening the second partition wall 122 and the bolts for fastening the stator 62 are arranged at overlapped positions in the circumferential direction, the radial size of the vehicle driving system 110 is reduced.

Figure 7:
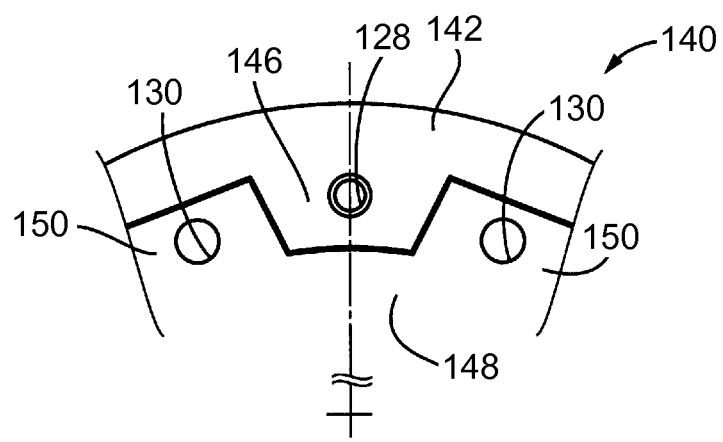
FIG. 7 is a view of a fastening portion of a first housing and a second partition wall in a vehicle driving system according to further another embodiment of the invention when viewed in an axial direction.

FIG. 7 is a view of a fastening portion of a first housing 142 and a second partition wall 148 in a vehicle driving system 140 according to further another embodiment of the invention when viewed in an axial direction, and corresponds to FIG. 4 and FIG. 6 in the above-described embodiments. When the vehicle driving system 140 shown in FIG. 7 is compared with the vehicle driving system 110 shown in FIG. 6, the vehicle driving system 140 differs from the vehicle driving system 110 in that fitting teeth 146 (internal teeth) provided in the first housing 142 and fitting teeth 150 (external teeth) provided in the second partition wall 148 are fastened to each other by mating. As in the case of the above-described vehicle driving system 10, the second partition wall 148 and the stator 62 are further fastened by bolts (not shown). Thus, the second partition wall 148 is further firmly fastened to the first housing 142. The remaining configuration is the same as that of the above-described embodiment, so a similar advantageous effect to that of the above-described embodiment is obtained.

The embodiments of the invention are described in detail with reference to the drawings; however, the invention is also applicable to other embodiments.

For example, in the above-described embodiment, each fastening portion of the second partition wall 36 for the bolt 100 is thin in the axial direction; instead, each fastening portion of the second partition wall 36 for the bolt 100 may have the same thickness as each fastening portion of the stator 62. In this case, not only the second partition wall 36 but also the stator 62 is assembled to the first housing 20a by the bolts 100.

The above-described embodiments are only illustrative, and the invention may be implemented in modes including various modifications or improvements on the basis of the knowledge of persons skilled in the art.

What is claimed is:

1. A vehicle driving system comprising:
   an engine;
   an electric motor;
   a clutch configured to selectively connect or interrupt a power transmission path between the engine and the electric motor;
   a torque converter;
   a transmission;
   a housing having an accommodation space that accommodates a front module and an accommodation space that accommodates the torque converter, the housing being a single member, the front module including the clutch and the electric motor;
   a partition wall separately provided from the housing, the partition wall provided between the accommodation space that accommodates the front module and the accommodation space that accommodates the torque converter in the housing, the partition wall separates the accommodation space that accommodates the front module and the accommodation space that accommodates the torque converter in the housing, and
   the engine, the electric motor, the clutch, the torque converter and the transmission being arranged in series with one another.

2. The vehicle driving system according to claim 1, wherein the electric motor includes a rotor and a stator that are fastened to the partition wall.

3. The vehicle driving system according to claim 2, wherein
   the partition wall is fastened to an inside of the housing by a bolt, and
   the bolt is fastened from a side on which the front module is provided.

4. The vehicle driving system according to claim 2, wherein
   the partition wall is fastened to the housing by a first bolt,
   the stator is fastened to the partition wall by a second bolt, and
   the first bolt and the second bolt are fastened from the same side.

5. The vehicle driving system according to claim 2, wherein
   the partition wall is fastened to the housing by a first bolt,
   the stator is fastened to the partition wall by a second bolt, and
   the first bolt and the second bolt are provided at overlapped positions in a circumferential direction.

6. The vehicle driving system according to claim 2, wherein the housing and the partition wall are fastened by mating, and are fastened by a bolt.

7. The vehicle driving system according to claim 1, wherein a rotor of the electric motor is supported by the partition wall.

8. The vehicle driving system according to claim 1, wherein the partition wall has an oil passage that supplies oil to at least one of the clutch or the electric motor.

9. A method of assembling a vehicle driving system, the vehicle driving system including an engine, an electric motor, a clutch, a torque converter, and a housing, the clutch being configured to selectively connect or interrupt a power transmission path between the engine and the electric motor, the method comprising:
- assembling the torque converter from one side of the housing in an axial direction of the housing;
- in a state where the torque converter has been assembled, inserting a partition wall into the housing from the same side as assembling of the torque converter, and then fastening the partition wall to the housing; and
- inserting a front module, including the clutch and the electric motor, from the same side as assembling of the torque converter, and then assembling the front module to the partition wall.

* * * * *